United States Patent
Chinn et al.

(10) Patent No.: US 9,244,673 B2
(45) Date of Patent: Jan. 26, 2016

(54) SYSTEM AND METHOD FOR UPDATING APPLICATION ARCHIVE FILES

(75) Inventors: Paul William Chinn, San Jose, CA (US); Eric Olaf Carlson, Mountain View, CA (US); Cameron Stuart Birse, San Jose, CA (US); James Mensch, San Jose, CA (US); Ronnie Misra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 439 days.

(21) Appl. No.: 13/605,838

(22) Filed: Sep. 6, 2012

(65) Prior Publication Data

US 2013/0332916 A1  Dec. 12, 2013

Related U.S. Application Data

(60) Provisional application No. 61/657,680, filed on Jun. 8, 2012.

(51) Int. Cl.
*G06F 9/44* (2006.01)
*G06F 9/445* (2006.01)
*G06F 17/00* (2006.01)
*H04L 9/00* (2006.01)
*G06F 17/30* (2006.01)
*H04L 29/06* (2006.01)

(52) U.S. Cl.
CPC .. *G06F 8/65* (2013.01); *G06F 9/44* (2013.01); *G06F 9/445* (2013.01); *G06F 17/00* (2013.01); *G06F 17/30* (2013.01); *H04L 9/00* (2013.01); *H04L 63/0428* (2013.01)

(58) Field of Classification Search
CPC ............. G06F 9/44; G06F 9/445; G06F 8/65; G06F 17/00; H04L 19/00; H04L 63/0428
See application file for complete search history.

(56) References Cited

U.S. PATENT DOCUMENTS

| | | | |
|---|---|---|---|
| 5,999,740 A * | 12/1999 | Rowley | 717/173 |
| 6,353,926 B1 * | 3/2002 | Parthesarathy et al. | 717/170 |
| 6,564,369 B1 * | 5/2003 | Hove et al. | 717/121 |
| 6,725,453 B1 * | 4/2004 | Lucas et al. | 717/178 |
| 7,124,408 B1 * | 10/2006 | Parthasarathy et al. | 717/170 |
| 7,478,381 B2 | 1/2009 | Roberts et al. | |
| 7,509,636 B2 | 3/2009 | McGuire et al. | |
| 7,546,594 B2 | 6/2009 | McGuire et al. | |
| 8,156,074 B1 | 4/2012 | Multer et al. | |
| 2003/0028867 A1 * | 2/2003 | Kryloff et al. | 717/171 |
| 2003/0041093 A1 * | 2/2003 | Yamane et al. | 709/201 |
| 2003/0093508 A1 * | 5/2003 | Li et al. | 709/222 |
| 2004/0059703 A1 | 3/2004 | Chappell et al. | |
| 2005/0055519 A1 * | 3/2005 | Stuart et al. | 711/159 |
| 2005/0132350 A1 * | 6/2005 | Markley et al. | 717/168 |
| 2007/0044029 A1 * | 2/2007 | Fisher et al. | 715/762 |
| 2010/0306175 A1 * | 12/2010 | Johnson et al. | 707/663 |

* cited by examiner

*Primary Examiner* — Van Nguyen
*Assistant Examiner* — Tina Huynh
(74) *Attorney, Agent, or Firm* — Blakely, Sokoloff, Taylor & Zafman LLP

(57) ABSTRACT

Systems, methods, and non-transitory computer-readable storage media for updating software applications installed on client computing devices, creating a manifest file describing the differences between multiple versions of application archives present in an application distribution system, and coordinating an update process for updating the applications on the client computing devices are disclosed. A scheme of hard-linking to existing files, downloading new files, and erasing unwanted files can be used.

23 Claims, 7 Drawing Sheets

SYSTEM AND METHOD FOR UPDATING
APPLICATION ARCHIVE FILES

CROSS REFERENCE TO RELATED
APPLICATIONS

This application claims the benefit of U.S. Provisional Patent Application No. 61/657,680, entitled "SYSTEM AND METHOD FOR UPDATING APPLICATION ARCHIVE FILES", filed on Jun. 8, 2012, and which is hereby expressly incorporated herein by reference in its entirety.

BACKGROUND

1. Technical Field

The present disclosure relates generally to the field of data processing involving software installation and management, and in particular relates to software application distribution systems and methods of updating and versioning software applications available in an application distribution system.

2. Introduction

Online commerce is quickly becoming a ubiquitous part of the modern economy. Additionally, consumers have grown accustomed to media and software applications that are intelligently designed, easily accessible, and hassle-free to use. Likewise, consumers have come to expect that the online marketplace will be streamlined and user-friendly as well.

An example of an online marketplace is a network-based application distribution system. Such a market offers software applications from software developers as both free and paid downloads. Downloaded applications also can be updated by software developers from time to time to fix bugs, update settings, add additional content and features, etc. However, many known application updating schemes are inefficient and oftentimes require that a large amount of data be sent over cellular networks or require a large amount of client device processing resources. The existing prior art methodologies can result in decreased cellular efficiency and a large cost to consumers in the form of decreased device performance, reduction of bandwidth available for other purposes, or reduced battery life.

Furthermore, it is inefficient, in updating an application, to upload to a client computing device an updated application file directory that contains each and every file, including identical, non-updated files, as the previous version of the application file directory already installed and stored on that device. Likewise, once an application update is downloaded, patching a file directory on-the-fly without a backup is risky because if a problem occurs, the user is left with a corrupted and non-functioning application. However, it is inefficient to create an entirely identical copy of an application directory simply to use as a backup in the event of a fatal update error.

Moreover, if users become accustomed to overly large downloads or long update processes, they may begin to ignore notices of important new updates, versions, or patches to applications installed on their devices. Ignoring such updates can lead to decreased device performance and possible vulnerability to malicious attacks, as well as additional maintenance requirements for system operators. For example, a quick application update with a patch to fix a minor problem can prevent the old software from crashing a device. Consequently, outdated applications on client devices having software bugs can impart very large maintenance costs to an application distribution system that supports those applications and their updates. Therefore, it is in the best interest of the administrators of the application distribution system that users of the applications update them without hesitation as soon as updates become available. Likewise, while keeping the general preference for users to update application when updates become available, it is in the best interest of the application distribution system to keep users' cellular carrier costs low so as not to discourage their use of the system. The disclosed technology of the present disclosure addresses the deficiencies known in the present state of the art and provides a novel solution and improvement thereof.

SUMMARY

Additional features and advantages of the disclosure will be set forth in the description which follows, and in part will be obvious from the description, or can be learned by practice of the herein disclosed principles. The features and advantages of the disclosure can be realized and obtained by using the instruments and combinations particularly pointed out in the appended claims. These and other features of the disclosure will become more fully apparent from the following description and appended claims, or can be learned by the practice of the principles set forth herein.

In particular, systems, methods, and non-transitory computer-readable storage media are herein disclosed for creating a manifest file describing the differences between multiple versions of application archive files present in an application distribution system and coordinating an update process for updating software applications on client computing devices.

Some embodiments of the present technology involve an application distribution system receiving updates, versions, or patches to application archive files contained therein. The application distribution system compares the various versions of the application files and creates one or more manifest files describing the differences between the versions. In some embodiments of the present technology comparing the various versions of application files involves comparing the file size of the file versions, comparing the directory structure of the various versions, or comparing the various versions at a binary level.

Some embodiments of the present technology involve the application distribution system distributing the manifest files to a plurality of users. Some embodiments of the present technology involve pushing badge notifications to users along with the manifest files.

Some embodiments of the present technology involve coordinating an update process to an updated version of an application for a user on the user's client computing device. In some embodiments, updating an application includes a system of pointers to directory files for hard-linking to existing files, ignoring erased files, and only downloading files that are not hard-linked to existing files. Some embodiments of the present technology involve sending test data along with a manifest file for testing the success of an update process. Also, some embodiments of the present technology involve deleting ignored files and files that have been replaced, while maintaining the hard links, upon determining that an update is successful.

BRIEF DESCRIPTION OF THE DRAWINGS

In order to describe the manner in which the above-recited and other advantages and features of the present disclosure can be obtained, a more particular description of the principles briefly described above will be rendered by reference to examples of specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for an improved application updating system. Accordingly, a system, method and non-transitory computer-readable media are disclosed for creating a manifest file describing the differences between multiple versions of application archive files present in an application distribution system and coordinating an update process for updating software applications on client computing devices. The approaches set forth herein can improve the efficiency and convenience of updating software on a computing device by using a method for improved patching. First, a description of an exemplary application distribution system is given.

Figure 1:
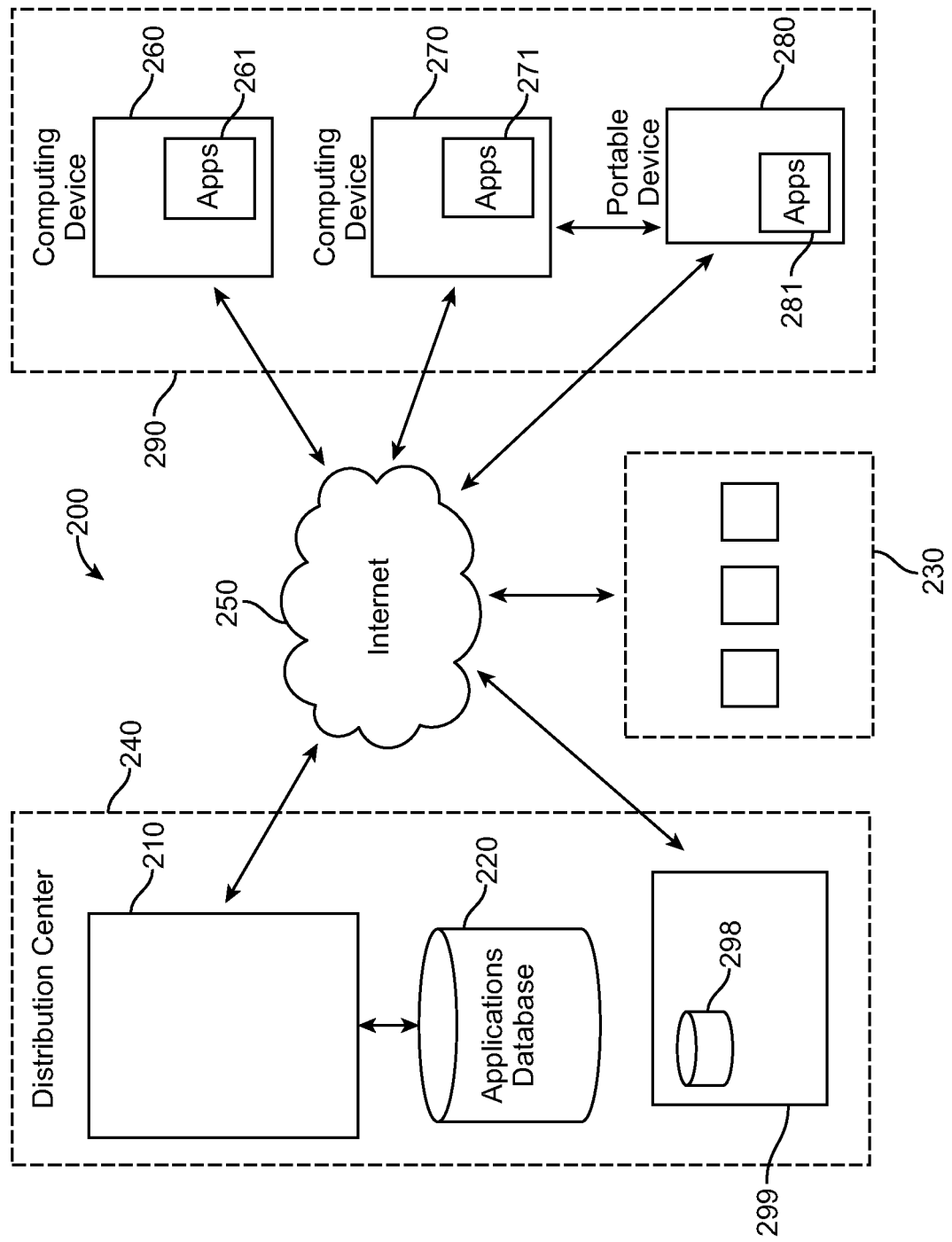
FIG. 1 illustrates an exemplary application distribution system according to some embodiments of the present technology.

FIG. 1 illustrates an exemplary application distribution system client-server environment 200 according to some embodiments of the present technology. In this example, an application distribution system 240 includes distribution center 210, applications database 220, and a patching module 299. System 240 can be connected to computing devices 260, 270, 280, and third party developers 230 through a communications network, such as the internet 250. It will be appreciated that these devices can be any computing device known in the art, whether a desktop computer, laptop, smart phone, tablet, etc. Further, these devices may be portable or in a fixed location. Together, distribution center 210, applications database 220, and patching module 299 of the application updating system 240 represent a server side of a client-server model 200. Similarly, computing devices 260, 270, and 280 together represent a client side 290 of the client-server model 200. It should be appreciated that references to a method being performed either server-side or client-side refers to devices on the server-side and client-side, respectively that substantially perform these methods.

As shown, the server side 240 communicates with the client side 290 via the internet 250. As an example, the server side 240 can be represented to a user as an online store for the sale and distribution of applications. A device from client side 290 can communicate with the online store over a communications network, such as the internet 250, using an application management computer program stored on the device. In other examples, the internet 250 can be replaced with other communication networks such as computer networks, telephone networks, Ethernet, local area networks, wired networks, wireless networks, and others.

Computing device 260 includes applications 261. Applications 261 can include applications that were downloaded or otherwise obtained from distribution center 210 by a user of computing device 260. To purchase desired applications from distribution center 210, a user may log into a user account. Logging into a user account can involve one or more requests for user authentication. Once logged in, the user may select a desired application to purchase. When the user agrees to pay the price of the application, the user's payment information is used to complete the transaction. Once the transaction is completed, the desired application is associated with the user's account, thus allowing the user to download the desired application and also updates of the desired application. In some embodiments of the present technology, the distribution center 210 can also offer free downloads.

Applications associated with user accounts also can be updated or additionally installed onto other devices that are associated with the same user account. In this example, computing device 260, computing device 270, and computing device 280 are all associated with the same user account and thus, are configured to receive updates and re-downloads of all applications that have been associated with that user account. Moreover, computing device 280 may communicate with computing device 270 to transfer digital data and applications between the two devices. In one example, computing device 280 may be configured to be a central repository containing all applications associated with the user account that transfers selected applications to computing device 280. In other examples, other digital products besides software applications and software programs (such as system software, enterprise software, multimedia files, video files, audio files, and image files) on a computing device can also be associated with the user account and distributed/re-distributed by distribution center 210 to any client devices associated with that user account.

The distribution center 210, which is coupled to applications database 220, is configured to sell, deliver, and maintain applications from applications database 220. Applications database 220 can be configured to store some or all of the applications available for distribution from server side 240. The applications can be sold, updated, and delivered, i.e. transmitted, to a device in client side 290 through a communication network, such as the internet 250. As such, distribution center 210 can represent an online store for applications. For example, applications database 220 can receive a request from distribution center 210 for an application and in response to the request, transmit the requested application to distribution center 210, which subsequently transmits the application to the requesting client device. The applications requested may be applications available for purchase or applications previously associated with a user account, e.g. previously purchased or pre-installed applications resident on the client device. In other examples, applications database 220 can directly transmit the requested application to the requesting device.

As explained above, applications are oftentimes updated, versioned, patched, or otherwise changed over time. For example, application updates are common to implement bug fixes or to provide new features. Additionally, some application developers intentionally roll out content on a semi-regular basis to extend the life of the application. However, as explained above, previous systems for applying updates need to be improved. Accordingly, some embodiments of the present technology involve systems and methods of improved application updating and patching.

Figure 2:
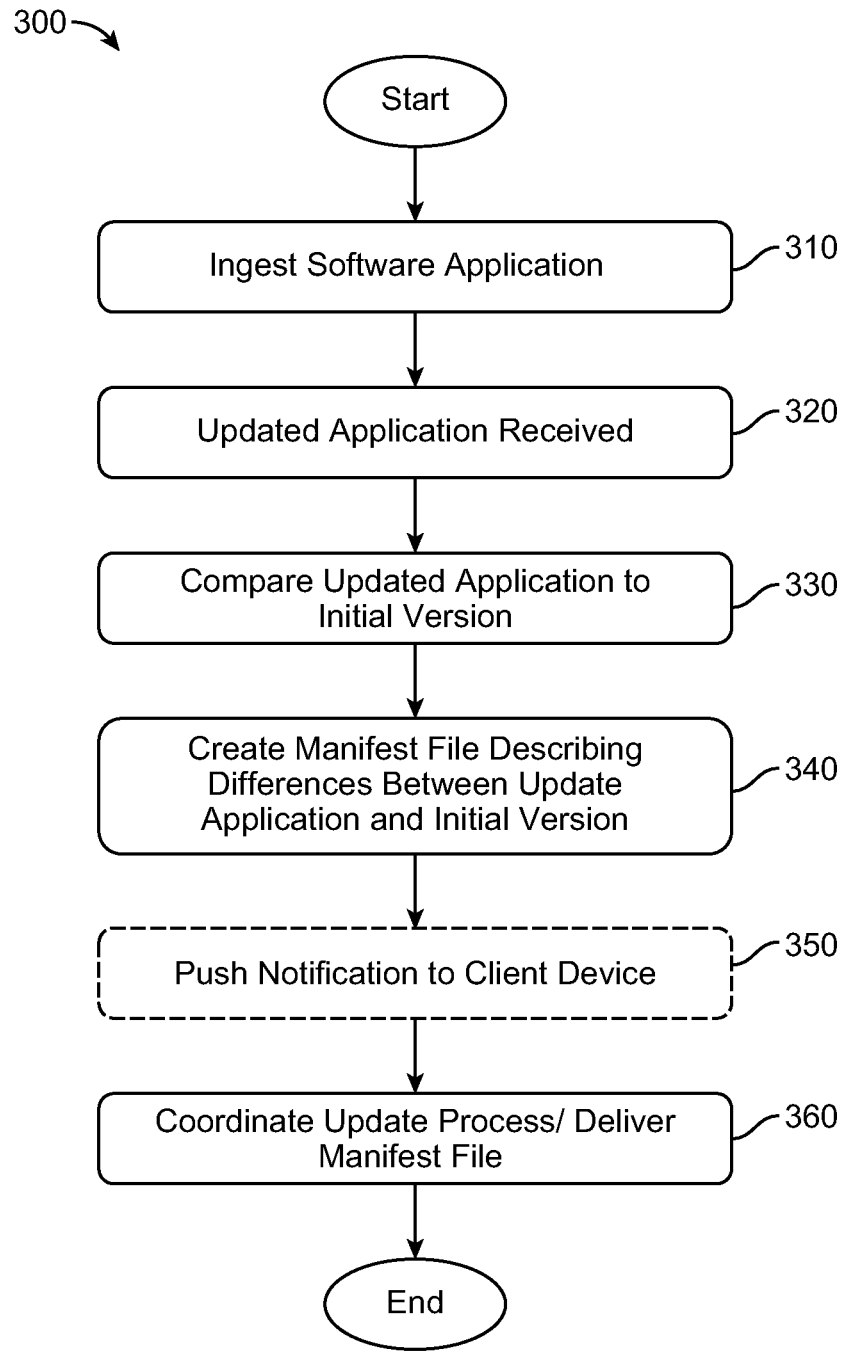
FIG. 2 illustrates an exemplary method for coordinating an application update process according to some embodiments of the present technology.

FIG. 2 illustrates an exemplary method 300 for coordinating an application update process according to an embodiment of the present technology. The method 300 can be performed in an application distribution system configured for ingesting a plurality of applications from third party developers and administrators of an application distribution system.

The method 300 begins with the application distribution system ingesting 310 a software application into the applications database of an application distribution center. Some embodiments of the present technology involve ingesting applications in an archive format including encrypted, compressed application files along with metadata describing the file directory structure, comments, etc. For example, some embodiments of the present technology involve ingesting files with an .ipa file extension into the applications database. Once ingested, the software applications become available for download by one or more of the computing devices over the internet.

Next, an updated version of the software application is received in the application database of the distribution center 320. However, as explained above, it can be inefficient to require that the entire contents of an updated application file directory be uploaded to replace a previous version of the application already installed on a client device. For example, an application update may involve only minor changes to implement bug fixes or may involve only changes including adding content to the previous version of the application. Indeed, when the differences between the previous version of the software application and the updated version are either very minor or include only additional content, it is inefficient to require that all of the files of the entire application directory be uploaded and stored in the distribution center and to require that client devices download the entire updated archive file directory. Accordingly, in the method 300 of the present technology, patching module 299 compares 330 the previous or initial software application with the updated application received at 320, and creates at 340 a manifest file describing the identified differences between the updated application and the previous or initial application currently resident in the database 220.

In some embodiments of the present technology, comparing the application files involves first comparing the file size of the currently installed version of the software application with the file size of the updated version. If there is no difference in file size, the currently installed version is determined to be the most recent version and no update is needed. Conversely, if there is a difference detected in the file size, it can be inferred that an update is needed. In some embodiments of the present technology, comparing the files can involve comparing the file directory structure of the currently installed version with the updated version. Differences in the directory structure can indicate changes to the current version and that an update is needed. In some other embodiments of the present technology, comparing the files can involve a binary level comparison.

In some embodiments of the present technology, users are notified about the presence of updates before receiving the actual update. Accordingly some embodiments involve the application distribution system optionally pushing 350 notifications to the computing devices. Some embodiments of the present technology can involve applications being represented by icons on the display of a computer device and the notification including a badge placed on an icon when an update is available. One example of such a badge can be found on various mobile and tablet devices made by Apple Inc. For example an iPhone™ displaying substantially square icons representing applications can include a small circular badge placed in one corner of the displayed icon. One example of a badge of this type being used for a different purpose can be seen on a phone application wherein a small badge displays a number that corresponds to the number of notifications from that application to the device. In some embodiments, the badge can be displayed over each application that has an update available. In some embodiments, a cumulative badge can be displayed over an application specific for managing application updates such as the App Store$^{SM}$ application on Apple Inc's iPhone®.

After the manifest file is created that describes the differences between the versions of the application, the patching module 299 coordinates 360 the update process and delivering of the manifest file to the affected computing devices.

Some embodiments of the present technology involve maintaining a history of patches or updates in an application distribution system. These embodiments are particularly useful with situations in which users are likely to update an application from an older version to a most recent version, wherein one or more intermediate updates were never performed. For example, suppose a user has an account with an application distribution center and has linked his account with two devices. When the user purchases and downloads an application on a first device, the first device can be synchronized with the second device such that the application is automatically copied to the second device. Further suppose that the user uses the application primarily on the first device and immediately updates the application on the first device whenever an update to a new version becomes available. However, the user may ignore the update on the second device or may use the application so infrequently on the second device that she does not notice that the update is available. When a subsequent update becomes available, suppose the user attempts to update the application on the second device from the initial version to the most recent version without ever updating to the intermediate version.

In this example, the patching module 299 would have already created manifest files to update from the initial version to the intermediate version and from the intermediate version to the most recent version; however, updating the second device in two steps is inefficient. Accordingly, some embodiments of the present technology involve storing multiple manifest files for each application update that accounts for a plurality of potentially different updates.

For example, referring again to FIG. 1, in some embodiments of the present technology the patching module 299 includes a manifest database 298. The manifest database 298 includes a plurality of manifest files describing the differences between various versions of one or more application files, thereby avoiding requiring multiple update processes to bring a legacy application up to date with the most recent version.

Figure 3:
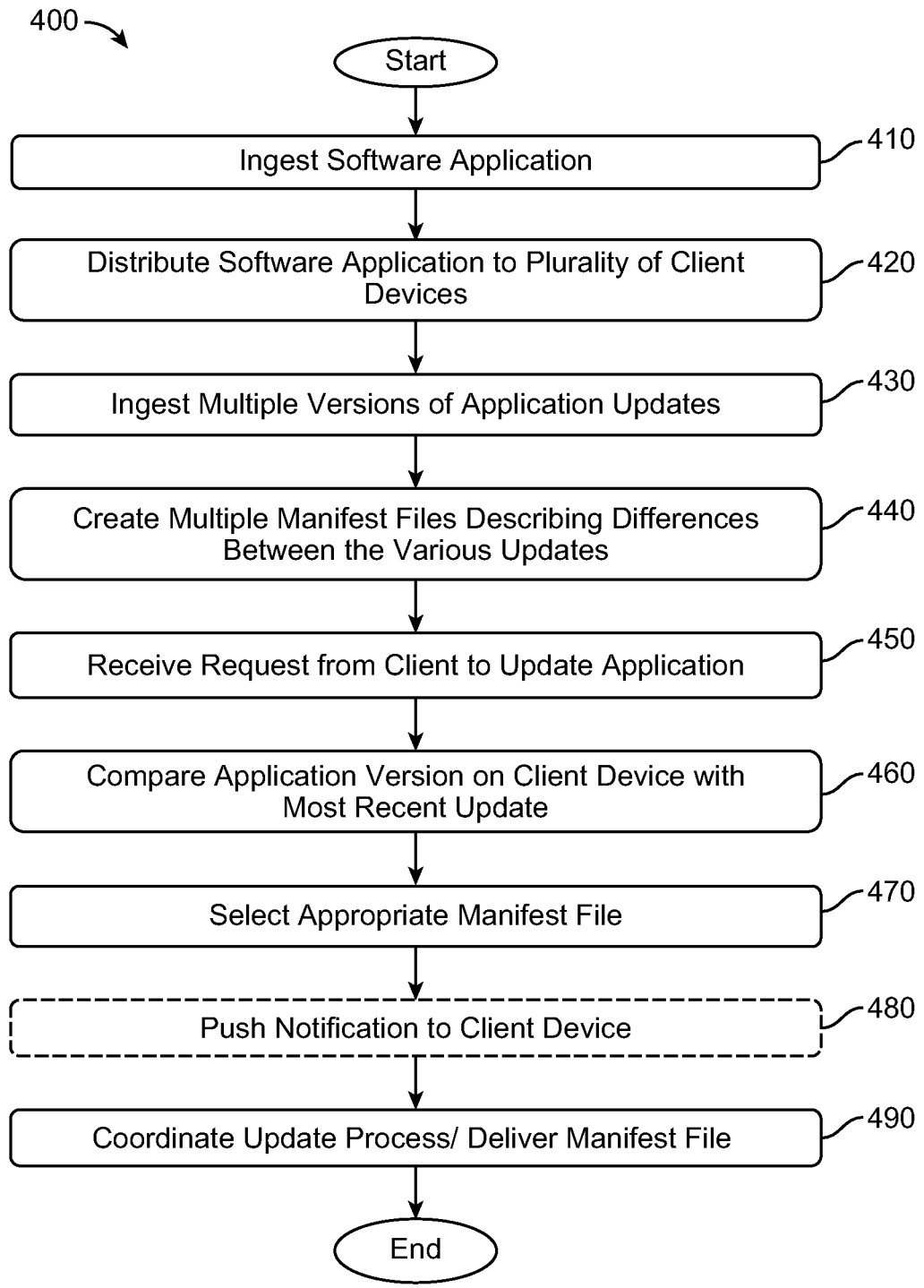
FIG. 3 illustrates an exemplary method for coordinating an application update process that avoids multiple updates to arrive at the most recent version according to some embodiments of the present technology.

FIG. 3 illustrates an exemplary method 400 for coordinating an application update process that avoids multiple updates to arrive at the most recent version according to some embodiments of the present technology.

The method 400 begins with the application distribution system ingesting 410 an initial version (e.g. v.1.0.0) of a software application into the applications database of an application distribution center and distributing 420 the software application to a plurality of client devices. Next, over a course of time, multiple updated versions (e.g. v.1.0.1; v.1.0.2; v.2.0.0; etc.) of the application are rolled out and uploaded 430 to the applications database of the distribution center. Accordingly, multiple manifest files are created 440 that describe the differences between all of the previous versions and the most recent version (e.g. v.1.0.0→v.2.0.0; v.1.0.1→v.2.0.0; v.1.0.2→v.2.0.0).

Next, a request is received 450 from a client device to update an application installed on the client device. The version of the application on the client device is compared 460 to the most recent update of the software application and the appropriate manifest file is selected 470. Some embodiments involve the application distribution system optionally pushing 480 notifications to the computing devices. Finally, the patching module 299 coordinates 490 the update process and delivery of the manifest file to computing devices.

After the server side 240 delivers a manifest file to a client device, the client device updates the software application. For example, a very straightforward process of application updating involves downloading or otherwise obtaining a complete version of an updated software application, locating a file directory containing an existing software application, and replacing the existing version of the software application with the updated version, thereby erasing the existing version. However, as explained above, in the case of mobile devices communicating with an application distribution system via a wireless connection, this process requires a large amount of data to be transmitted over a cellular network, thereby potentially involving additional cost for increased bandwidth, increased data transfer usage, etc. Additionally, existing methods of updating archive files are oftentimes very inefficient due to the client side memory usage and processing required.

Accordingly, it is beneficial to utilize a manifest file that comprising a scheme of pointers that describe the differences between the existing version of an application and the updated version. Therefore, some embodiments of the present technology also include innovative updating processes using a manifest file that significantly reduce both the amount of data that must be sent to the computing devices and the amount of processing power and memory usage required to perform the actual update on the computing devices.

There are numerous ways to carry out a process of updating a software application using a manifest file comprising a scheme of pointers that describe the differences between the existing version of an application and the updated version. For example, using a processor, a client device can compare the file directories of an existing version of a software application and the manifest file and update on-the-fly by: locally copying files in the directory that remain unchanged to the new updated directory, downloading only new files from an update server, replacing files in the directory that are altered in the update, and erasing files from the directory that do not exist in the updated directory.

Figure 4:
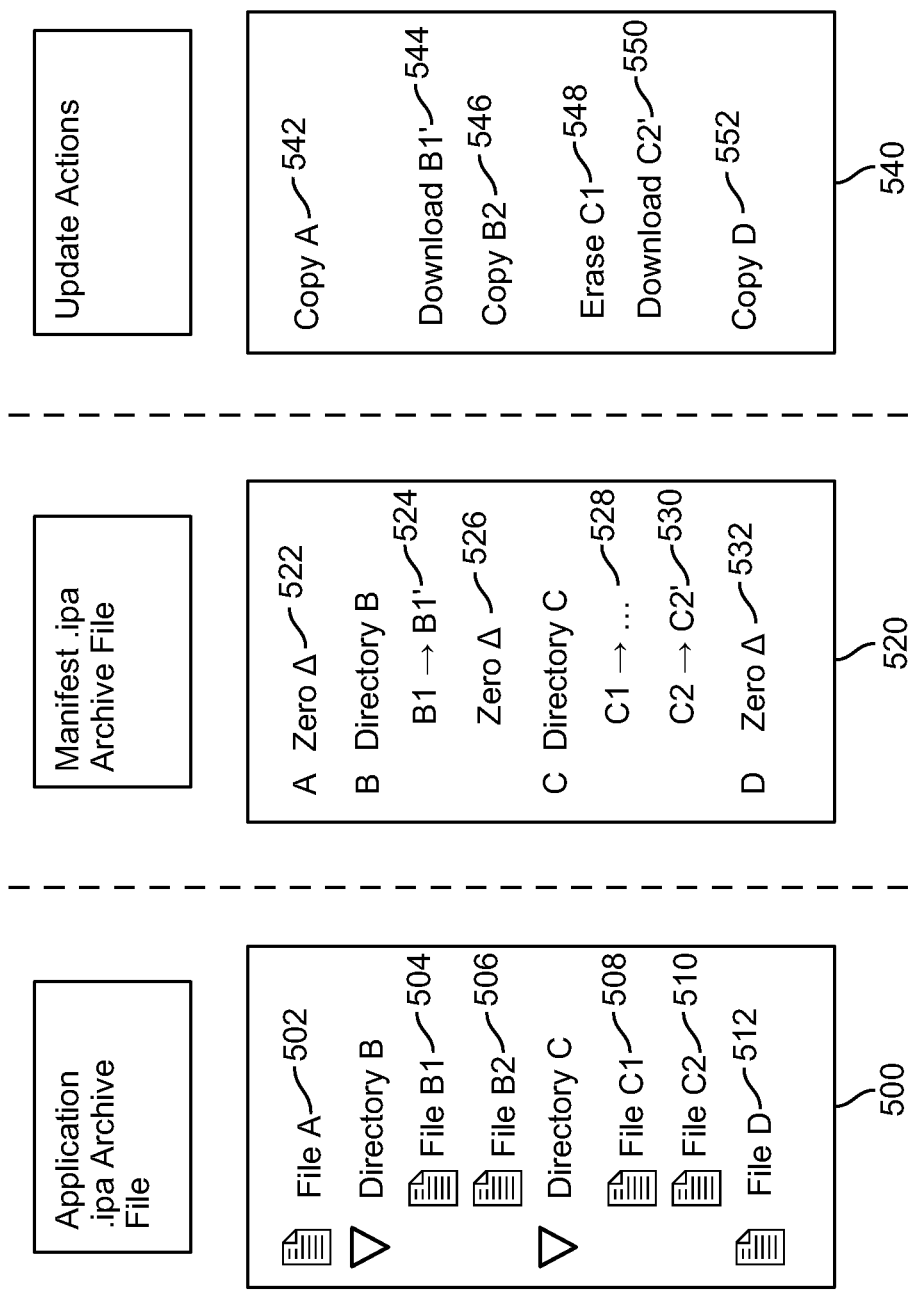
FIG. 4 illustrates a graphical representation of an exemplary on-the-fly update process according to some embodiments of the present technology.

FIG. 4 illustrates a graphical representation of such an exemplary on-the-fly update process according to some embodiments of the present technology. According to FIG. 4, an application archive file 500 includes a file directory structure organizing a plurality of files 502, 504, 506, 508, 510, 512. Also, a manifest file 520 includes instructions 522, 524, 526, 528, 530, 532 for updating the application archive file 500. According to the example in FIG. 4, the instructions in the manifest file 520 include: an instruction 522 not to change anything with file A (502); an instruction 524 to replace file B1 (504) with B1'; an instruction 526 not to change anything with file B2 (506); an instruction 528 to erase file C1 (508); an instruction 530 to replace file C2 (510) with C2'; and an instruction 532 not to change anything with file D.

Additionally, FIG. 4 illustrates a representation 540 of the actions 542, 544, 546, 548, 550, 552 used to update the application archive file 500 in a process of on-the-fly copying of files that are not changed, downloading new files, and erasing files from the directory. In some embodiments, the update actions also involve a scheme of pointers to the files in the original application directory. More specifically, these actions include copying file A (542), downloading file B1' (544), copying file B2 (546), erasing file C1 (548), downloading file C2 (550), and copying file D (552).

In sum, the process represented in FIG. 4 requires that three files be copied, two files be downloaded, and that one file be erased. However, the process represented in FIG. 4 may result in a fatal error that can corrupt the entire application in the event that the process experiences an error during execution, since on-the-fly updating does not preserve an original copy of the application file 500.

Figure 5:
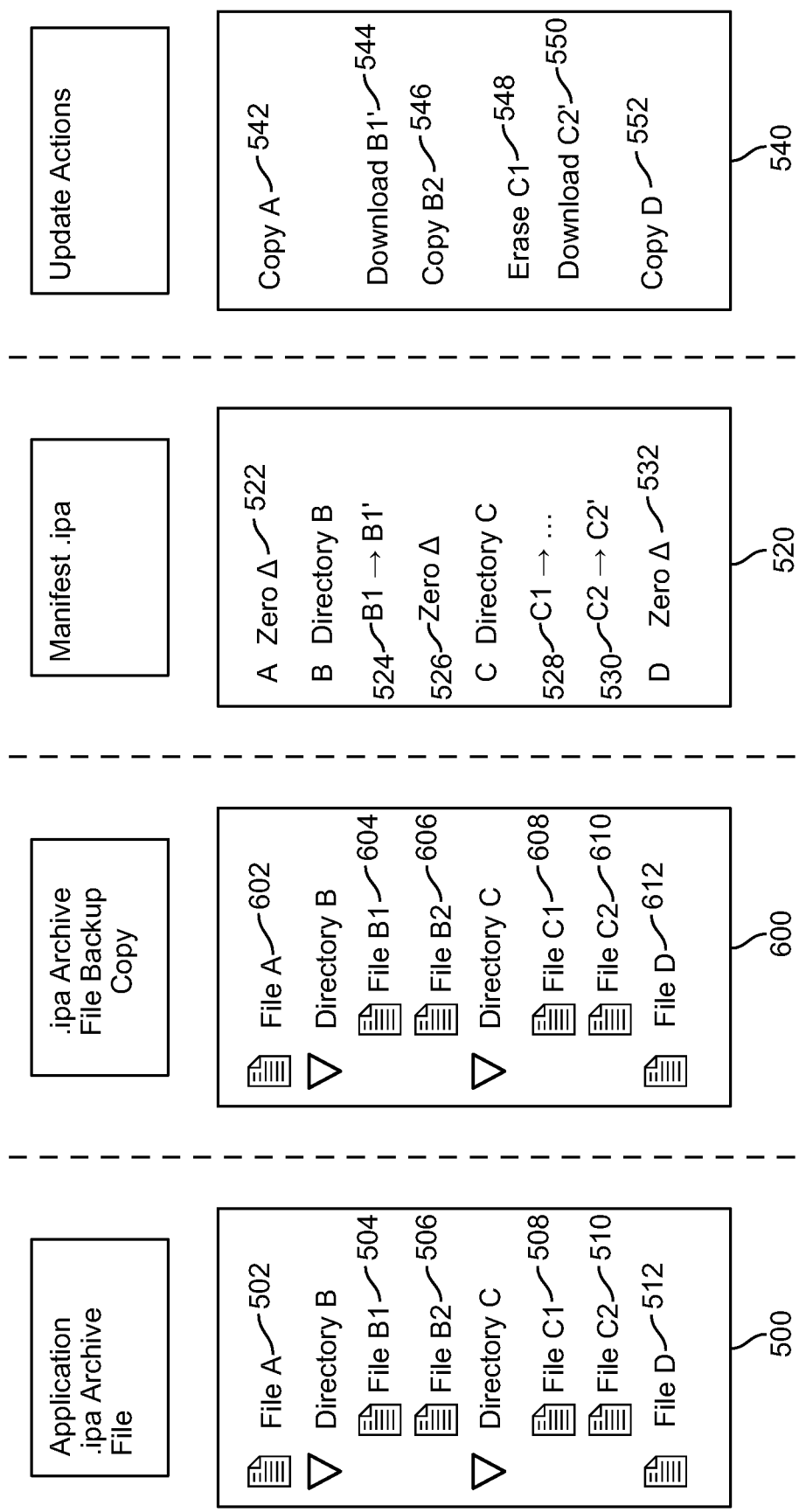
FIG. 5 illustrates a graphical representation of an update process that preserves a backup copy of the original application file according to some embodiments of the present technology.

Accordingly, FIG. 5 illustrates a graphical representation of an update process that preserves a backup copy of the original application file according to some embodiments of the present technology. According to FIG. 5, the process includes the same application archive file 500, the same file directory structure, files 502, 504, 506, 508, 510, 512, and manifest file 520 instructions 522, 524, 526, 528, 530, 532 as in FIG. 4. However, FIG. 5 also includes an archive file backup copy 600 containing a complete set of backup files 602, 604, 606, 608, 610, 612. According to this process, the update actions 542, 544, 546, 548, 550, 552 are the same as in FIG. 4, but the process represented in FIG. 5 is protected because the processor can revert to the archive file backup copy 600 in the event of a fatal error experienced during the updating process. Of course, it is understood that the added backup protection in the process represented in FIG. 5 requires more processing power and memory usage than the process of FIG. 4 because of the added step of making and storing the archive file backup copy 600.

Some embodiments of the present technology improve inefficient processes of updating a software application using a manifest file. For example, FIG. 6 illustrates a process of updating an application file using a manifest file showing the differences between the file and an updated version of the file and using a scheme of links according to some embodiments of the present technology.

Figure 6:
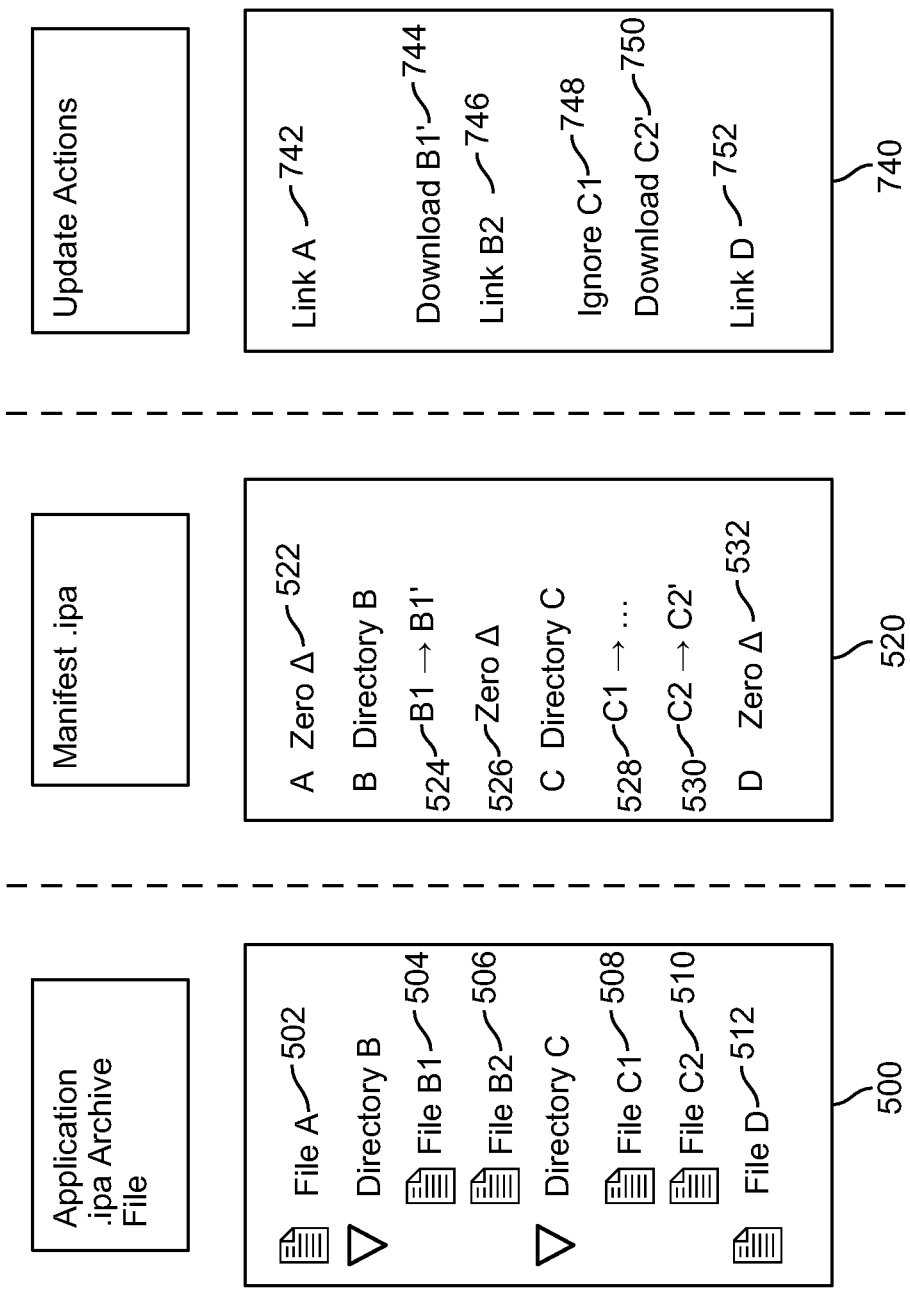
FIG. 6 illustrates a process of updating an application file using a manifest file showing the differences between the file and an updated version of the file and using a scheme of links according to some embodiments of the present technology.

According to FIG. 6, the process includes the same application archive file 500, the same file directory structure, files 502, 504, 506, 508, 510, 512, and manifest file 520 instructions 522, 524, 526, 528, 530, 532 as in FIG. 4 and FIG. 5. However, the update actions employed in FIG. 6 involve the use of hard links to some of the files in the original application archive file 500.

As used herein, a hard link is a notation in a file directory which serves as a persistent or semi-persistent shortcut to a file in a local or distributed file system. For example, a hard link can include a label used in the new application file that links to the actual file contents present in an old file directory. The hard link is not a separate copy of the old file, but rather a different name for exactly the same file. Accordingly, when updating the software application, files that remain unchanged by the manifest file do not have to be copied. Rather, their new names are simply hard-linked to the original files. Consequently, FIG. 6 involves a set of much simpler update actions 740 to create a new application file including: hard-linking to original file A (742), downloading file B ' (744), hard-linking to original file B2 (746), ignoring file C1 (748), downloading file C2' (750), and hard-linking to original file D (752).

Indeed, these update actions involve no copying and only involve downloading two files. Consequently, the device's processing and memory resources are conserved. Additionally, the update process of FIG. 6 does not suffer from the potential occurrence of fatal errors as in the process of FIG. 4 because the original files are not being erased or replaced on-the-fly.

Once the update actions are completed and the newly updated application is verified to function properly, any files in the original application archive file 500 that are not hard-linked to the updated application can be deleted. To this end, some embodiments of the present technology involve analyzing a resultant update file directory to determine whether the update process worked properly. In some embodiments of the present technology, the manifest file is sent along with test data to test the resultant file directory. According to these embodiments, once the test data is analyzed with satisfactory results, the files in the pre-existing application file directory that are not hard-linked to the new application file are erased.

The application archive file shown in FIGS. 4-6 includes an .ipa archive file; however, it will be readily apparent to those skilled in the art that the innovative process of updating applications can be extended to any of a wide variety of file structures now known or later developed.

Figure 7:
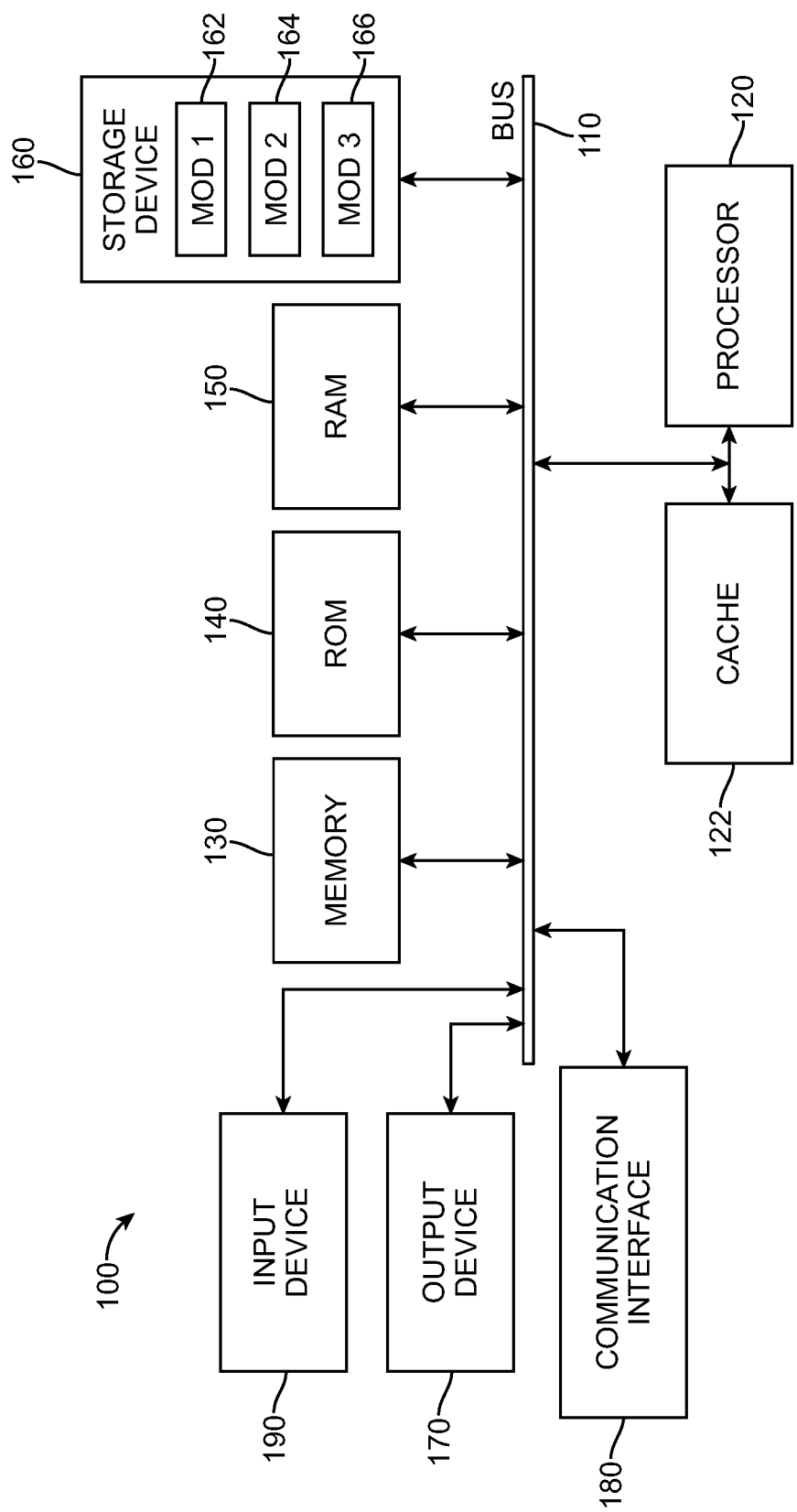
FIG. 7 illustrates an example system embodiment.

An example of a basic general purpose system or computing device which can be employed to practice the concepts of the present disclosure is disclosed in FIG. 7. As shown, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 7 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 7 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 7 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of improving users' experiences with updating applications that are offered to a user account in an online application distribution store or market for installation on a computing device such as a personal computer, laptop, game console, smart phone, mobile phone, or tablet PC.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method for updating an application installed in a computing device, the method comprising:

comparing, in an application distribution system, a first version of an application resident on said application distribution system with a received updated version of the application;

creating, in the application distribution system, a manifest file describing differences between the first version of the application and the received updated version of the application;

said manifest file including pointers to each of:
file portions that are not changed in the updated version of the application with respect to the first version of the application,
file portions that are deleted from the updated version of the application with respect to the first version of the application, and
file portions that are changed in the updated version of the application with respect to the first version of the application; and distributing the manifest file to the computing device wherein the computing device updates said installed application using information in said manifest file by ignoring the file portions that are deleted in the updated version of the application, and by hard-linking the file portions that do not change in the updated version of the application, wherein hark-linking the file portions that do not change comprises notating a file directory of the updated version of the application with a persistent shortcut to the file portions that do not change in the first version of the application.

2. The method of claim 1, further comprising:
distributing test data to the computing device along with the manifest file to test functionality of the updated version of the application using said hard-linking.

3. The method of claim 2,
wherein the updated version of the application is tested using the test data; and
wherein said the hard-linking update process is determined to be successful when said test is passed.

4. The method of claim 1, further comprising:
ingesting, in the application distribution system, a plurality of additional versions of the application; and
comparing, in the application distribution system, content files of all previously ingested versions of the application with content files of a latest version of the application;
creating, in the application distribution system, a plurality of manifest files each describing differences between a previously ingested version of the application and said latest version of the application; and
transmitting to the computing device the manifest file that corresponds to the differences between a version of the application installed on the computing device and said latest version.

5. The method of claim 1, wherein said comparing comprises:
comparing a file size of the first version with a file size of the updated version.

6. The method of claim 5, further comprising:
determining an update is not required, upon determining that the file size of the first version with the file size of the updated version is equal.

7. The method of claim 1, wherein comparing the first version of the application with the updated version of the application comprises:
comparing a content of the first version of the application with a content of said updated version of the application.

8. The method of claim 7, wherein comparing the content comprises comparing a structure and content of the file directory in the first version with a structure and content of the file directory in the updated version.

9. The method of claim 7, wherein comparing the content comprises a binary level comparison of the first version with the updated version.

10. The method of claim 1, wherein distributing the manifest file comprises:
connecting to the computing device;
authenticating the computing device;
receiving a query for new versions of the installed application on said computing device; and
notifying the computing device of the existence of a new version of the application.

11. The method of claim 10, wherein the notification comprises a graphical indication displayed on a screen of the computing device.

12. The method of claim 1, further comprising:
ingesting, in the application distribution system, at least one additional version of the application, wherein at least some of the file portions of the application are different than those in the first version of the application, and automatically distributing a notification to a plurality of computing devices that a new version of the application exists in the application distribution system.

13. A system comprising:
a network-based application distribution system including one or more processors configured to connect the network-based application distribution system with a plurality of client devices and with a plurality of application developers,
an application database storing a resident version of a software application;
a non-transitory computer-readable medium storing instructions that, when executed by the one or more processors of a computing device, cause the network-based application distribution system to:
compare said resident version of the application with an updated version of the application received from an application developer;
create a manifest file describing differences between said resident version and said updated version received from said application developer, said manifest file containing scheme of pointers to:
file portions that are not changed in the updated version with respect to the resident version,
file portions that are deleted from the updated version with respect to the resident version,
file portions that are changed in the updated version with respect to the resident version; and
distribute the manifest file to the client devices wherein the client devices can update a previous version of the application using information in said manifest file by ignoring the file portions that are deleted in the updated version of the application, and by hard-linking the file portions that do not change in the updated version of the application, wherein hark-linking the file portions that do not change comprises noting a file directory of the updated version of the application with a persistent shortcut to the file portions that do not change in the previous version of the application.

14. The system of claim 13, further configured to distribute test data to a client device along with the manifest file.

15. The system of claim 14, further configured to receive, from one or more of the client devices, test results describing that said hard-linking was successful.

16. A non-transitory computer-readable storage medium storing instructions which, when executed by a computing device, cause the computing device to:
compare a first version of an application with a received updated version of the application;
create a manifest file describing differences between the first version of the application and the received updated version of the application, said manifest file including a scheme of pointers to:
file portions that are not changed in the updated version with respect to the first version,
file portions that are deleted from the updated version with respect to the first version, and
file portions that are changed in the updated version with respect to the first version; and
distribute the manifest file to a computing client device containing an installed version of said application, wherein the computing device updates said installed application using information in said manifest file by ignoring the file portions that are deleted in the updated version of the application, and by hard-linking the file portions that do not change in the updated version of the application, wherein hark-linking the file portions that do not change comprises noting a file directory of the updated version of the application with a persistent shortcut to the file portions that do not change in the first version of the application.

17. The non-transitory computer-readable storage medium of claim 16 storing instructions which, when executed by the computing device, further cause the computing device to:
distribute test data to the client device along with the manifest file to test functionality of the updated version of the application using said hard-linking; and
receive an indication from the client device that the test data was used to determine that the updated version of the application updated successfully.

18. The non-transitory computer-readable storage medium of claim 16 storing instructions which, when executed by the computing device, further cause the computing device to:
  ingest a plurality of additional versions of the application; and
  compare the content of all previously ingested versions of the application with a latest version of the application;
  create a plurality of manifest files each describing differences between a previously ingested version of the application and said latest version of the application; and
  transmit to the client device the manifest file that corresponds to the difference between the version of the application installed on the client device and said latest version.

19. The non-transitory computer-readable storage medium of claim 16 storing instructions which, when executed by the computing device, further cause the computing device to:
  connect to the client device;
  authenticate the client device;
  receive a query for new versions of the installed application on said client device; and
  notify the client device of the existence of a new version of the application.

20. A method for updating an application installed in a computing device, the method comprising:
  receiving, in a client device, a manifest file describing updates to the application having a first version that is stored on the client device, said manifest file including pointers to:
    file portions that are not changed by the updates with respect to the first version of the application,
    file portions that are deleted by the updates with respect to the first version of the application, and
    file portions that are changed by the updates with respect to the first version of the application; and
  creating an updated version of the application by ignoring the file portions that are deleted in the updated version of the application, hard-linking the file portions to that do not change in the updated version of the application, and downloading the file portions that are changed by the updates with respect to the first version of the application from an application distribution system, wherein hark-linking the file portions that do not change comprises notating a file directory of the updated version of the application with a persistent shortcut to the file portions that do not change in the first version of the application such that the file portions that do not change do not consume memory resources and such that errors caused by unnecessarily replacing the file portions that do not change while updating the application are prevented.

21. The method of claim 20, further comprising:
  receiving test data from the application distribution system to test functionality of the updated version of the application using said hard-linking; and
  testing the updated version of the application using the test data.

22. The method of claim 21, further comprising:
  determining that the manifest file successfully updated the first version of the application to the updated version;
  deleting the file portions that are changed in the updated version of the application;
  deleting files that are erased in the updated version of the application archive file; and
  maintaining a hard link between the file portions that do not change in the updated version of the application with respect to the first version of the application.

23. The method of claim 20, further comprising:
  sending authentication data to the application distribution system; and
  querying the application distribution system for the existence of new versions of the installed application.

* * * * *

UNITED STATES PATENT AND TRADEMARK OFFICE
CERTIFICATE OF CORRECTION

PATENT NO. : 9,244,673 B2
APPLICATION NO. : 13/605838
DATED : January 26, 2016
INVENTOR(S) : Paul William Chinn et al.

It is certified that error appears in the above-identified patent and that said Letters Patent is hereby corrected as shown below:

Claims

Column 12

Line 54, Claim 1, delete "hark-linking" and substitute -- hard-linking --.

Column 14

Line 21, Claim 13, delete "hark-linking" and substitute -- hard-linking --.

Column 14

Line 53, Claim 16, delete "hark-linking" and substitute -- hard-linking --.

Column 16

Line 1, Claim 20, delete "to".

Column 16

Line 5, Claim 20, delete "hark-" and substitute -- hard- --.

Signed and Sealed this
Twenty-sixth Day of April, 2016

Michelle K. Lee
*Director of the United States Patent and Trademark Office*